March 31, 1964    T. R. LONG    3,127,578
MAGNETOSTRICTIVE DELAY LINE UTILIZING TORSIONAL WAVES
Filed March 27, 1958    2 Sheets-Sheet 1

INVENTOR
T. R. LONG
BY
Kenneth B. Hamlin
ATTORNEY

March 31, 1964  T. R. LONG  3,127,578
MAGNETOSTRICTIVE DELAY LINE UTILIZING TORSIONAL WAVES
Filed March 27, 1958  2 Sheets-Sheet 2

INVENTOR
T. R. LONG
BY
Kenneth B Hamlin
ATTORNEY

United States Patent Office 3,127,578
Patented Mar. 31, 1964

3,127,578
MAGNETOSTRICTIVE DELAY LINE UTILIZING TORSIONAL WAVES
Thomas R. Long, Bridgewater Township, Somerset County, N.J., assignor to Bell Telephone Laboratories, Incorporated, New York, N.Y., a corporation of New York
Filed Mar. 27, 1958, Ser. No. 724,389
4 Claims. (Cl. 333—30)

This invention relates to magnetostrictive apparatus and more particularly to such apparatus employed for the production and utilization of ultrasonic impulses.

The generation of ultrasonic strain impulses in magnetoelastic materials in response to electrical driving signals is a feature that is characteristic of many signal delay lines and information storage devices. Equally characteristic is the employment therein of means for converting the ultrasonic strain impulses into corresponding electrical output signals. In the prior art both functions are accomplished by a transducer apparatus, most frequently in the form of a solenoid winding inductively coupled to the magnetoelastic rod wire or tube element, which transducer apparatus determined a longitudinal magnetization of the magnetoelastic material. In accordance with known principles, the longitudinal magnetization is determinative of operation in the longitudinal mode of strain impulse propagation. While for many purposes such conventional transducers continue to provide a satisfactory solution, their conversion efficiency is undesirably low at medium pulse frequencies and decreases at higher frequencies. At not unreasonably high frequencies the diameter of such transducer windings tends to become a critical factor in maintaining optimum flux coupling with the increasingly small diameter magnetoelastic elements that are resorted to in order to reduce eddy current losses and to increase the frequency response. The mechanical and electrical design problems involved in constructing such small transducer windings for optimum flux coupling to the one or two mil diameter magnetoelastic elements frequently specified are further aggravated when the requirement for variable delay or alterable memory is set forth thereby necessitating that a transducer be readily movable to any specified position along the length of the magnetoelastic element.

One approach to the elimination of the transducer winding is demonstrated in the copending application of J. R. Perucca, Serial No. 722,402, filed March 19, 1958, which invention in one of its aspects is directed to the elimination of the need for input transducer windings in magnetostrictive delay lines nad information storage devices. Conversion of ultrasonic into electrical pulses is therein still accomplished, however, through the use of an output winding inductively coupled to the magnetoelastic member and responsive to the change in longitudinal magnetic flux component incident to the presence of the ultrasonic strain impulse in that portion of the magnetoelastic element under the output winding. The dissociation of the requirement for output windings as well as input windings from the performance of the interchangeable conversion of electrical and ultrasonic strain impulses would further simplify and improve the performance of magnetostrictive delay lines and memory elements.

Accordingly, it is an object of the present invention to improve the efficiency of impulse conversion in magnetostrictive delay lines and memory elements.

Another object of the present invention is to provide simplified impulse conversion in magnetostrictive delay lines and information storage devices.

A further object of the present invention is to provide more compact and economical signal delay and data storage apparatus.

The foregoing objects are realized in accordance with the principles of this invention wherein a strain impulse launched in a magneto elastic member is detected by applying a magnetic field at a predetermined point in the member and by sensing the change in potential produced across the ends of the member as the strain impulse arrives at the predetermined point and distorts the magnetic field applied thereat. In one illustrative embodiment, an improved magnetostrictive delay line is provided wherein a torsional strain impulse is generated by conductively applying a current pulse to a magnetoelastic member in the presence of a first applied magnetic field and wherein the torsional strain impulse so generated is detected by sensing the potential variations occurring across the ends of the member as the torsional impulse arrives in that portion of the member wherein a second magnetic field is applied.

In another illustrative embodiment of the invention, an improved information storage device is provided wherein information recorded as a remanent pattern of magnetization in either of two regions of a magnetoelastic member is reproduced by detecting the pattern of potential variations effected in one of the regions by an interrogating current pulse conductively applied to the other. In one aspect thereof, the interrogating current pulse generates but a single strain impulse which impulse, upon traveling to the second region of the magnetoelastic member, sequentially modifies the constituent elements of the recorded magnetization pattern thereby generaitng in such second region a corresponding sequence of electrical pulses. Alternatively, the interrogating current pulse may be applied to that portion of the member wherein the respresentative magnetization pattern has been recorded to generate therein a correspondingly distributed pattern of strain impulses which strain impulses upon traveling to the further portion of the magnetoelastic member sequentially generate therein the corresponding electrical pulses.

Accordingly, it is a feature of the present invention that strain impulses in a magnetoelastic member be detected by causing the strain impulses to effect a variation in electrical potential in the member.

It is another feature of the present invention that the magnetic state of a magnetoelastic member be determined according to the pattern of voltages generated in the member upon the application thereto of a strain impulse.

It is a further feature of the present invention that a signal delay line comprise a magnetoelastic element in which a conductively applied input signal generates, after a predetermined interval, a variation in electrical potential.

It is a still further feature of the present invention that an interrogating impulse initiated in one part of a magnetoelastic information storage element effects in another part thereof the generation of output impulses corresponding to the stored information.

It is another feature of the present invention that a common magnetic field be applied to a magnetostrictive element both to generate and to detect strain impulses.

The foregoing and other objects and features of the present invention may be more readily understood from the following detailed description and the accompanying drawing in which.

Figure 1:
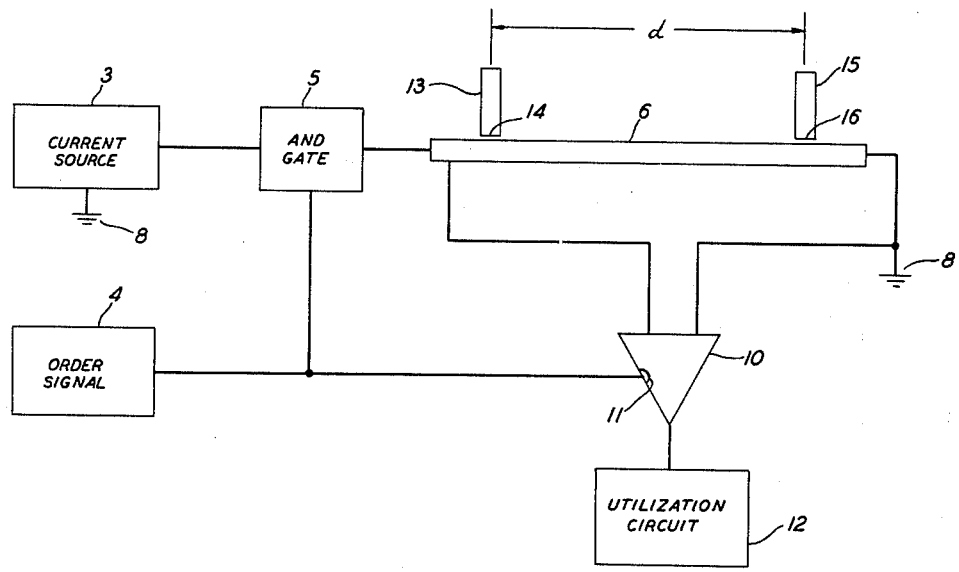
FIG. 1 is a schematic representation of a magnetostrictive delay line in accordance with one illusrative embodiment of this invention.

In FIG. 1 there is shown a magnetostrictive delay line apparatus comprising a current source 3 and an order signal source 4 each connected to "AND" gate 5, which gate when actuated by order signal source 4 conductively connects current source 3 to the left-hand end of magnetoelastic member 6. The right-hand end of member 6 is returned to the ground terminal of current source 3 via ground 8. Amplifier 10 is connected to amplify any changes of potential appearing across the ends of member 6 except during the period when current source 3 is connected to member 6 at which time order signal source 4 concurrently inhibits amplifier 10 via actuation of inhibit terminal 11 thereof. Utilization circuit 12 is connected to the output of amplifier 10 and receives the amplified changes of potential appearing across the ends of member 6. A first source of magnetic flux such as bar magnet 13 is positioned so that one pole 14 thereof is close to or in contact with magnetostrictive member 6 and a second source of magnetic flux such as bar magnet 15 is positioned along member 6 at a distance $d$ from magnet 13. In accordance with the principles set forth in the above-mentioned application of J. R. Perucca, a torsional strain is produced in member 6 due to the interaction between the longitudinally bifarious magnetic field established in the magnetostrictive member 6 by bar magnet 13 and the circumferential magnetic field established in member 6 by the current therethrough when current source 3 is connected thereto. This torsional strain impulse travels down the magnetoelastic member and upon arriving in that portion of member 6 in the vicinity of bar magnet 15 effects therein a distortion of the magnetic field configuration due to magnet 15. The distortion of this magnetic field arises from the change in magnetic permeability produced in member 6 by the strain impulse and the characteristics thereof are dependent upon the particular magnetostrictive coefficient of the material comprising member 6. For materials having a positive coefficient the permeability will be increased by the strain impulse along the direction of greatest tension while for materials with a negative coefficient the increase in permeability will be along the direction of greatest compression.

Figure 2:
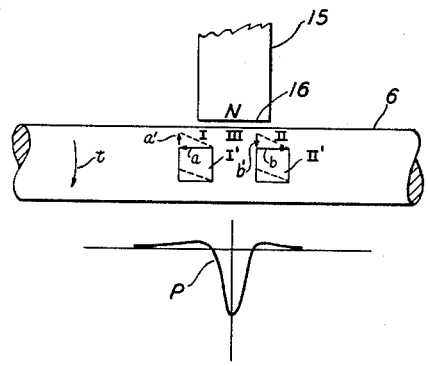
FIG. 2 is an enlarged diagrammatic view illustrating a representative portion of the apparatus shown in FIGS. 1, 3 and 4.

The generation of the potential variation in member 6 during the passage of the strain impulse through the region of member 6 subject to the influence of magnet 15 may be more easily understood by referring now to the enlarged schematic representation depicted in FIG. 2. Assuming that pole 16 of magnet 15 is a north pole, the lines of induction emanating therefrom will, in accordance with the well known characteristics of magnetic fields, enter member 6 and form therein a magnetic field configuration, the principal attributes of which may be approximately described in the three regions therein labeled I, II and III. In region I the lines of induction due to pole 16 are represented by longitudinal field vector $a$ pointing to the left and in region II the lines of induction due to pole 16 are represented by longitudinal field vector $b$ pointing to the right. In the transition region III therebetween, the magnetic lines of induction due to pole 16 are principally transverse to the longitudinal axis of member 6 but for purposes of clarity the detailed vector relationships existing therein have been omitted from the drawing. The torsional strain impulse $t$ propagating from left to right in member 6 will cause a distortion of the successive elemental regions thereof, two of which are schematically indicated as the elemental areas I' and II'. The torsional strain impulse is depicted at the moment of passing the elemental area I' and again at the moment of passing the elemental area II' and is shown as producing a distortion of these areas. Assuming a positive magnetostrictive coefficient for member 6, in region I the dynamic strain indicated by the distorted elemental area I' will produce a circumferential flux component in the direction of $a'$, and similarly, in region II, the dynamic strain indicated by the distorted elemental area II' will produce a circumferential flux component in the direction of $b'$. The assumption of a negative magnetostrictive coefficient for member 6 will similarly result in the production of circumferential flux components, it being remembered of course that the torsional strain impulse will in that case cause the flux to tend to lie along the direction of maximum compression and thus the circumferential flux components occasioned by the strain will lie in the opposite direction to that indicated by vectors $a'$ and $b'$. The circumferential flux components so produced link member 6, and in accordance with Lenz's law produced an electromotive force between the ends thereof proportional to the time rate of change of flux effected by the passage of the torsional strain impulse. Inasmuch as the direction of circumferential flux component $a'$ is opposite to that of circumferential flux component $b'$, the rate of change of flux with time, as well as with distance, is greatest as the torsional strain impulse travels from region I to region II and, consequently, the voltage appearing across the ends of member 6 will reach a maximum at this time. The waveform of the potential $p$ developed across the ends of member 6, and which potential $p$ is sensed by amplifier 10, is shown in approximate space relationship with member 6 and magnet 15 in FIG. 2.

Figure 3:
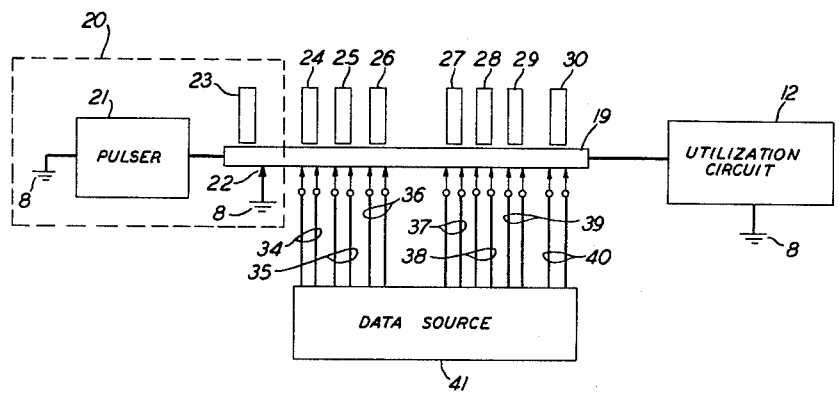
FIG. 3 is a schematic representation of an information storage device in accordance with the principles of this invention.

FIG. 3 shows a magnetostrictive apparatus employable either as a signal delay line or information storage device comprising a magnetoelastic member 19 conductively connected at its left end to current pulser 21 and at its right end to utilization circuit 12. A first conductive path through member 19 is provided for pulser 21 between the left end of member 19 and ground connection 22, and a second conductive path through member 19 is provided for utilization circuit 12 between the right end of member 19 and connection 22. Connection 22 provides a flexible electrical contact to apply ground potential to member 19 without introducing any rotational damping therein and advantageously may be realized through the use of a mercury pool. Located along member 19 between the left-hand end thereof and ground connection 22 is bar magnet 23 positioned with respect to member 19 in the same manner as bar magnet 13 of FIG. 1. In accordance with the principles of operation previously described in connection with FIG. 1, the application of a current pulse to member 19 produces therein by interaction with the magnetic field of magnet 23 a torsional strain impulse which then propagates throughout the length of the member. Distributed along member 19 between the left end thereof and ground connection 22 are bar magnets 24–30. While only seven such magnets are shown, it will be appreciated that any number thereof may be spaced along member 19 to form therein a magnetization pattern representative of information to be stored. It is immediately apparent that not only the spacing but also the polarity and strength of each of the bar magnets 24–30 may be selected in accordance with whatever code it is desired to employ for the representation of intelligence in member 19. It is to be further understood that the bar magnets 24–30 represent but one convenient means for producing a remanent magnetization pattern in member 19 and that other equally advantageous means for producing a remanent pattern in member 19 may be employed. For example, a remanent magnetization pattern may be produced by conductively applying current pulses from data source 41 to selected pairs of terminals 34–40 of member 19 to establish therein regions of remanent circumferential magnetic flux representative of the information to be recorded, and further distinctive remanent magnetization patterns may be effected in member 19 with equally advantageous results by the use of both such terminals and such bar magnets.

The information thus recorded in member 19 may be read out by energizing torsional impulse generator 20, which, as shown in FIG. 3, includes current pulser 21, bar magnet 23 and the portion of member 19 to the left of ground connection 22 to produce a torsionally propagating strain impulse in member 19. The torsional impulse, as it propagates toward the right end of member 19, will sequentially modify each of the longitudinal magnetic flux configurations established in member 19 by bar magnets 24–30 and/or the circumferential magnetic flux configurations established through energization of terminals 34–40, generating a corresponding pattern of electrical signals which appear between ground connection 22 and the right end of member 19. The manner of generating the electrical signals (between ground connection 22 and the right end of member 19) incident to the use of the torsional strain impulse and magnets 24–30 is essentially similar to that already described in connection with FIG. 2. The generation of electrical signals incident to the use of the torsional strain impulse and the circumferential fields established through the selective energization of terminals 34—40 is readily comprehended on the basis of the operation of Faraday's law which states that an E.M.F. will be induced in a circuit whenever there is a change in the magnetic flux linked with it. A change in circumferential magnetic flux density is effected by the torsional strain impulse through a modification of the circumferential permeability of member 19 in each of the regions thereof associated with the terminals 34–40. This change in circumferential magnetic flux density links member 19 inducing a voltage therein in fashion similar to that described in connection with circumferential field vectors $a'$ and $b'$ of FIG. 2.

Figure 4:
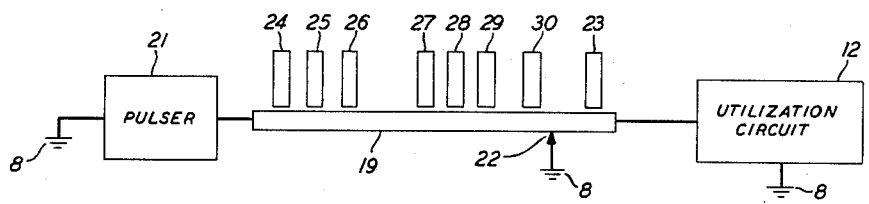
FIG. 4 is a schematic representation of another form of information storage device in accordance with this invention.

In FIG. 4 there is shown an alternative information storage embodiment wherein magnets 24–30 again perform functions similar to those of FIG. 3. In the read out of information stored in accordance with this embodiment, however, the application of a current pulse by pulser 21 to member 19 generates substantially simultaneously a torsional strain pulse in each region of member 19 associated with each of the magnets 24–30. This pattern of torsional strain impulses travels down member 19 and the individual impulses thereof sequentially distort the magnetic field established in member 19 by the readout magnet 23 generating a corresponding pattern of electrical signals which appear between ground connection 22 and the right end of member 19.

Figure 5:
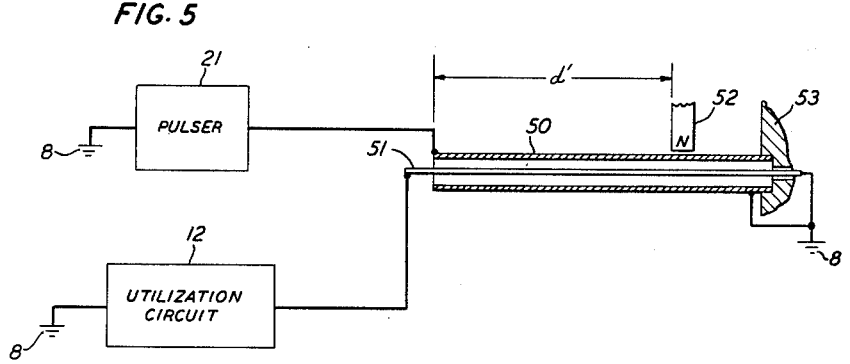
FIG. 5 is a schematic representation of another magnetostrictive apparatus illustrative of the principles of this invention.

A magnetostrictive delay line employing a common flux source, advantageously provided by a simple bar magnet for both strain impulse generation as well as for strain impulse detection, is shown in FIG. 5. In this configuration a hollow magnetoelastic tube 50, suitably damped for mechanical vibration at its right end, is conductively supplied with electrical current pulses by pulser 21. A concentric conductor 51, insulated throughout its length from tube 50, is connected at its left end to utilization circuit 12 and at its right end to tube 50. The application of a current pulse to tube 50 produces a strain impulse therein by interaction with the magnetic field supplied by magnet 52. The strain impulse thus generated propagates throughout the length of tube 50, that portion of the strain impulse traveling toward the right end of member 50 being damped by damping pad 53, and that portion of the strain impulse traveling toward the undamped left end of tube 50 being reflected thereat and redirected toward the right end of tube 50. The redirected strain impulse upon passing under magnet 52 produces a distortion of the successive elemental regions of tube 50 in similar fashion to that occasioned by the passage of the strain impulse in FIG. 2 and, accordingly, a similar circumferential magnetic flux component is produced in tube 50. This circumferential magnetic flux component links conductor 51 inducing therein an E.M.F. in accordance with Faraday's law equal to the negative of the time rate of increase of the circumferential flux. The E.M.F. so induced is applied to utilization circuit 12. To achieve the same signal delay time, it is apparent that the distance $d'$ of FIG. 5 need be only half that of distance $d$ of FIG. 1. It is also apparent that the connection of pulser 21 to tube 50 and utilization circuit 12 to conductor 51 may be respectively interchanged to achieve a mode of operation similar to that described above with equally advantageous results.

It is to be understood that numerous other arrangements and modifications as well as other applications may be devised by one skilled in the art without departing from the spirit and scope of this invention.

What is claimed is:

1. In an adjustable ultrasonic delay line, an electrically conductive delay line capable of having torsional strain impulses propagated therethrough and output means for detecting the occurrence of one of said torsional strain impulses, said output means including a bar magnet having one pole positionable adjacent the specific point along said delay line at which said one impulse is to be detected and the other pole thereof remote from said delay line, said one pole causing flux to follow paths in said delay line at said point in opposite directions away from said specific point, and detector means conductively connected to said delay line for detecting the voltage change on interaction of said one impulse and said flux from said one pole.

2. Solenoidless apparatus for translating ultrasonic torsional strain impulses propagated along a conductive magnetoelastic delay line into corresponding electrical pulses comprising voltage pulse detecting means, magnet means having but a single pole positioned directly adjacent a point on said delay line and causing a magnetic field to have components in opposite directions from said point along the longitudinal direction of said delay line, and means conductively connecting said voltage detecting means to said delay line on opposite sides of said point.

3. A solenoidless magnetostrictive delay line comprising a longitudinally disposed magnetoelastic member, means for launching a torsional strain impulse along said delay line, said launching means including a first magnetic means having but a single pole positioned directly adjacent a first point on said delay line and current source means conductively connected to said line, and output means for detecting the occurrence of said strain impulse at a second point on said delay line, said output means including a second magnetic means having but a single pole positioned directly adjacent said second point on said delay line, said second magnetic means causing a magnetic field to have components in opposite directions from said second point along the longitudinal direction of said delay line, and voltage detecting means conductively connected to said delay line on opposite sides of said second point.

4. A solenoidless magnetostrictive delay line in accordance with claim 3 further comprising means connecting said current source means to said voltage detecting means to inhibit operation of said voltage detecting means on energization of said current source means.

References Cited in the file of this patent

UNITED STATES PATENTS

| | | |
|---|---|---|
| 2,828,470 | Mason | Mar. 25, 1958 |
| 2,846,666 | Epstein et al. | Aug. 5, 1958 |
| 2,914,757 | Millership et al. | Nov. 24, 1959 |

OTHER REFERENCES

"Modern Magnetism" (Bates), published by Cambridge, 1951 (England), pages 415–416 relied on.

The Bell System Technical Journal, November 1957, vol. XXXVI, No. 6. The Twistor, article by Bobeck, pp. 1319–1340.